United States Patent [19]

Collins et al.

[11] Patent Number: 4,830,439

[45] Date of Patent: May 16, 1989

[54] SEPARABLE SCRAPER BAR ATTACHMENT FOR TRACK-TYPE VEHICLES

[75] Inventors: James M. Collins, Fredricksburg; Robert E. Clark, Falmouth, both of Va.

[73] Assignee: The United States of America as represented by the Secretary of the Army, Washington, D.C.

[21] Appl. No.: 105,370

[22] Filed: Oct. 7, 1987

[51] Int. Cl.$^4$ ............................................. B62D 55/00
[52] U.S. Cl. ......................................... 305/11; 305/12
[58] Field of Search .......................... 305/11, 12, 13; 280/158

[56] References Cited

U.S. PATENT DOCUMENTS

| | | | |
|---|---|---|---|
| 2,560,307 | 7/1951 | Slemmons | 305/12 |
| 2,637,603 | 5/1953 | Cartlidge | 305/12 |
| 3,976,337 | 8/1976 | Vaughn | 305/12 |
| 4,134,622 | 1/1979 | Krolak et al. | 305/12 |
| 4,531,787 | 7/1985 | Hart et al. | 305/12 |
| 4,763,961 | 8/1988 | Parrott | 305/60 X |

FOREIGN PATENT DOCUMENTS

| | | | |
|---|---|---|---|
| 822687 | 10/1959 | United Kingdom | 280/159 |
| 83/01234 | 4/1983 | World Int. Prop. O. | 305/12 |

Primary Examiner—Johnny D. Cherry
Assistant Examiner—Russell D. Stormer
Attorney, Agent, or Firm—John E. Becker; Anthony T. Lane

[57] ABSTRACT

A detachable or separable scraper bar attachment for various types of tracked vehicles includes first, second, and third generally planar rectangular bar elements which when fixedly interconnected and attached to a vehicle's body frame form a generally U-shape or μ-shape configuration, of which the first and third bar elements constitute generally parallel legs of the u-shape or μ-shape portion. It is mounted with the legs generally also parallel to the vehicle's cylindrical drive sprocket hub subassembly. One leg is in close proximity to the hub to facilitate the scraping of collected mud or debris, and the other leg is adapted to be operatively rigidly attached to the vehicle frame; and the second bar element which constitutes a bight portion connecting the legs of the u-shape or μ-shape portion is notably canted at an angle of between about 45° and 60° to laterally deflect the scraped-off mud or debris away from the track paths. The separable mounting of the second and third bar elements is necessary to facilitate mounting, demounting and related maintenance involving the drive sprocket hub assembly.

12 Claims, 4 Drawing Sheets

SEPARABLE SCRAPER BAR ATTACHMENT FOR TRACK-TYPE VEHICLES

GOVERNMENT INTEREST

The invention described herein may be manufactured and used by or for the U.S. Government for governmental purposes without the payment of any royalties therefor or thereon. This application and patent may be assigned outright to the U.S. Government.

BACKGROUND OF THE INVENTION

Various track type vehicles, such as crawler tractors, military tracked vehicles, and the like, include a pair of endless tracks, one mounted on each side thereof to propel the vehicle both forwardly and rearwardly, with steering effected by forcible track skewing. Each of the tracks is mounted on the vehicle's frame being entrained about the usual idler wheel and driven by toothed sprocket wheels from the final drive line enclosed in a housing also mounted in the frame.

During certain conditions particularly when operating in moist soil the tracks tend to pickup the mud, snow, ice and other abrasive foreign material which tends to impact between the track assembly and the housing. In vehicles whose sprocket wheels have no self clearing apertures or other scraper means, this mud and foreign material not only increases tractive effort, and adds undue wear, but also tends to build up and throw off or break the track, particularly when the aforementioned skewing action is involved.

Among the prior art are various different forms of scrapers adapted for tractors and other tracked vehicles to try to mitigate or solve the same general problem for their particular vehicle needs. Some of the more relevant prior U.S. Patents include U.S. Pat. No. 2,560,307 to Slemmons, which is directed to specific scraper bar means embodying a projecting nib to register within a general V-shape groove of the band and pulley drive system. U.S. Pat. No. 2,637,603 to Cartlidge involves a more complex two piece stripper ring which completely surrounds the central portion of its drive hub. U.S. Pat. No. 3,976,337 is directed to yet another different type of combined scraper/striker bar for cleaning and preventing debris buildup of its tracked vehicle. The cantilevered single blade form of angularly disposed striker bar is specifically different from the other patented devices and the present scraper, and extends downwardly relative to the rotational axis of its drive sprocket or annular member. U.S. Pat. No. 4,134,622 to Krolak et al. teaches still different generally U-shape scrapers which are differently disposed and the first of which removes foreign material from the chain and the second of which removes foreign material from the track. Lastly, U.S. Pat. No. 4,531,787 to Hart et al. is for a still different inverted V-shaped semi-flexible elastomeric deflector.

While the various prior art patents may satisfy the needs of their particular vehicles, the present scraper is directed to a simplified basically three-part scraper assembly uniquely needed to remove and avoid debris buildup from the inner half portions of the type of drive sprocket hubs which do not lend themselves to the provision of self-cleaning apertures, which apertures are provided in its outer half counterpart particularly for many military type vehicles, as will be be described in more detail hereinafter. The types of vehicles on which the present scraper attachment has been found to work very successfully, include various military tracked vehicles which use the M88chassis, including an M-88 tank retriever vehicle, the counter obstacle vehicle, and the M-60 tank, among others. This particular chassis is provided with several tie-down eyelets same of which are particularly useful for attachment by one form of the scraper assembly of this invention with a separable support portion of said novel scraper bar assembly being adapted to be welded thereto.

OBJECTS AND BRIEF SUMMARY OF THE INVENTION

Accordingly it is a primary object of this invention to provide a relatively simple, basically three part scraper bar assembly means for tracked vehicles for preventing the buildup and compacting of mud and other debris and the like between the track assembly and drive sprocket hub and/or other structured elements of the vehicle. More particularly, it is an object of this invention to provide the simplified scraper bar means for use with the innermost non-apertured hub portion of tracked vehicles which embody a non-apertured inner hub portion and a peripherally apertured hollow open-ended outer hub portion, such vehicles including but not limited to various forms of military tracked vehicles.

The present scraper bar assembly briefly comprises first, second, and third generally planar rectangular bar elements which when fixedly interconnected form a generally U-shape or μ-shape bracket or subassembly of which the legs portions thereof are essentially parallel to each other and to the surface of the cylindrical drive sprocket hub subassembly. The bracket assembly is attached to the vehicle's frame in a manner so that the scraper bar leg portion or bar element is in close proximity to the cylindrical surface of the innermost sprocket hub portion to facilitate scraping or removal of collected mud and debris. The intermediate or second bar element which supports the scraper bar element is canted so as to laterally deflect the debris inwardly so as to fall between the track assemblies.

Other objects and advantages will become more apparent from the following detailed description and the accompanying illustrative drawings.

DETAILED DESCRIPTION OF THE INVENTION

Figure 1:
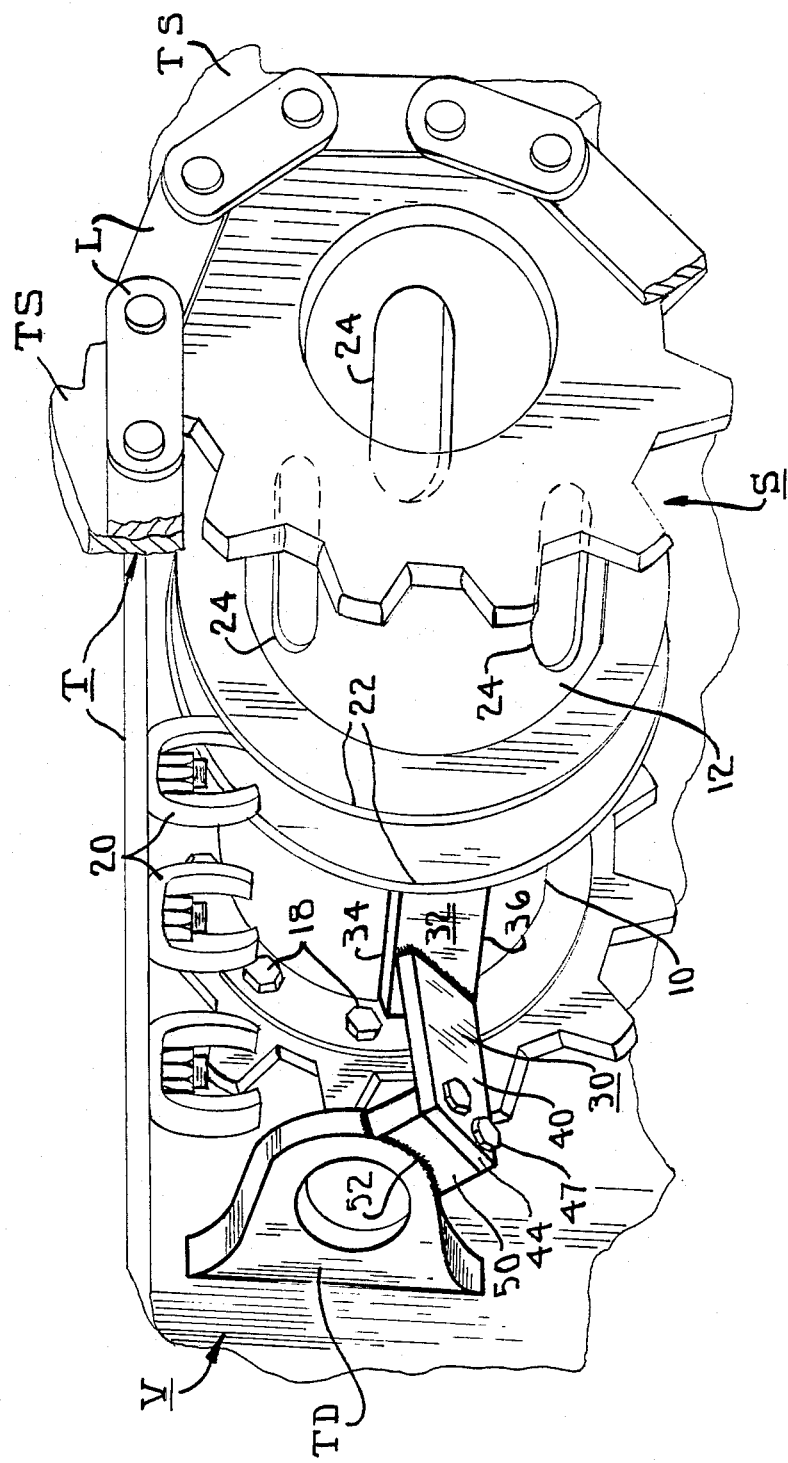
FIG. 1 is a perspective view of one preferred form of the invention scraper bar as assembled adjacent the innermost hub portion of a cylindrical drive sprocket means of a tracked vehicle.
Figure 2:
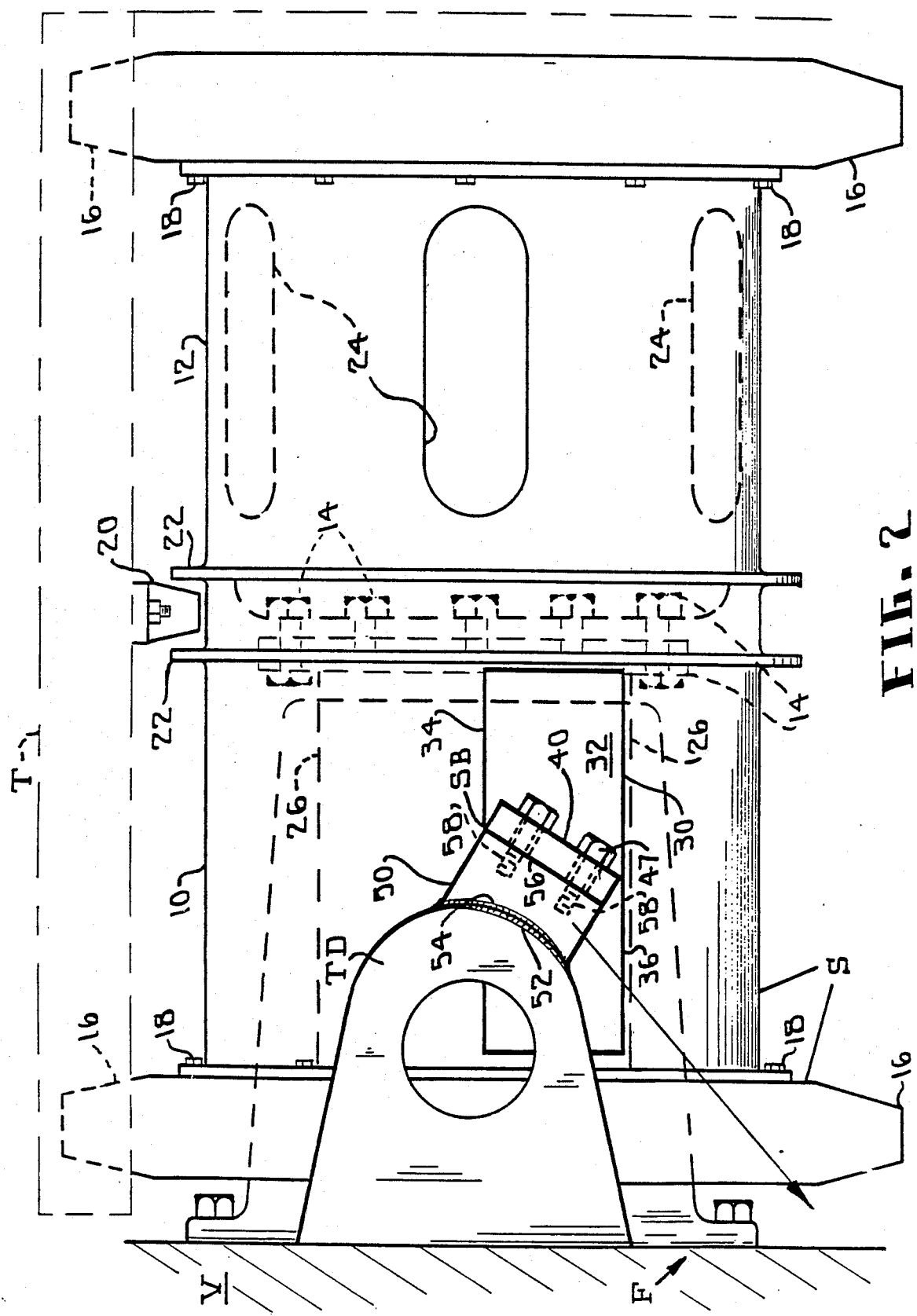
FIG. 2 is front elevational view of the scraper assembly and fragmentary portions of vehicle, drive sprocket and track assembly.

Referring to FIGS. 1 and 2 of the drawings, only a fragmentary portion of a typical track-type vehicle V is shown, including a fragmentary part of the body frame F and a fragmentary semi-schematic portion of a conventional endless track assembly T. Each track assembly T comprises a plurality of interconnected links L having associated track shoes TS (FIG. 1). Each track is disposed along opposite sides of the vehicle V, being entrained about one or more toothed sprocket drive wheel and hub subassemblies S and one or more related, but not shown, idler wheels which also are movably mounted on frame F in a known manner. The subject invention scraper bar assembly is designated generally SB, shown rigidly mounted adjacent an inner portion of the sprocket drive wheel and hub subassembly S.

Referring more specifically to the same FIGS. 1 and 2, the sprocket drive wheel and hub subassembly S comprises axially aligned non-apertured inner sprocket hub portion 10 and peripherally apertured outer sprocket hub portion 12. Hub subassembly S may be suitably connected to drive shaft end 26 as by bolt assemblies 14 (FIG. 2). Toothed sprocket gears 16 are suitably attached as by bolt assemblies 18 to each of the cylindrical sprocket hub portions, the sprockets being adapted to engage the endless track T to motivate the vehicle V. Track T, as illustrated, includes a series of center guide members 20 adapted to help center and guide the track T by their following or traveling within or between the spaced flange members 22 affixed to the midportion of the drive sprocket hub subassembly. These guide members 20 may inherently supplementally serve to help clean any residual mud or debris from portions of the track. In this regard, the outermost sprocket hub portion 12 is of hollow or annular form and is provided with a plurality of preferably three 120° circumferentially spaced elongated apertures 24 and has an open outer end. This arrangement enables a certain part of the mud or debris which would otherwise collect, to pass through and become expelled via apertures 24 and the open free end thereof. The innermost hub portion 10 is not similarly apertured due to the character and necessity for its assembly onto drive shaft means 26 (FIG. 2). Thus, it is in conjunction with this innermost hub portion 10 that the present invention scraper bar attachment SB is adapted to be mounted to prevent debris buildup and damaging compaction forces which would otherwise occur as described in the previous background of the invention.

Figure 3:
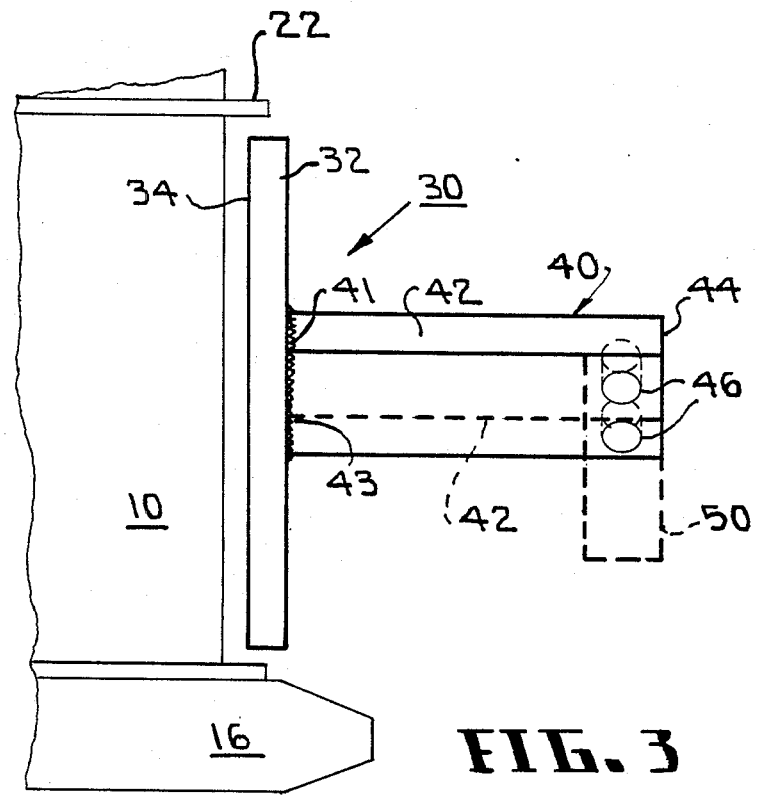
FIG. 3 is top plan detail view showing the first and second bar elements assembled in solid lines and the third bar element shown in broken lines, related to a fragmentary portion of the innermost portion of a drive sprocket hub.
Figure 4:
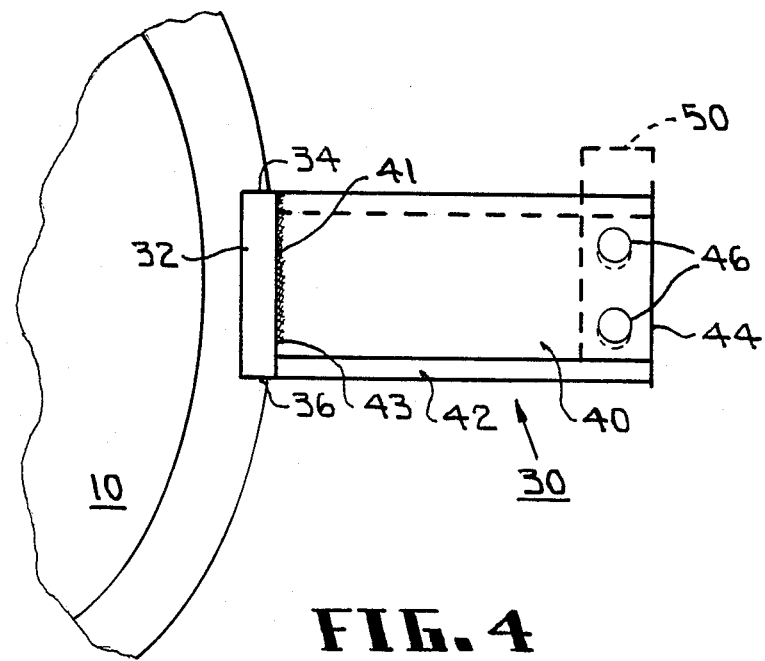
FIG. 4 is a side view of the same scraper bar elements and portion of drive sprocket hub shown in FIG. 3.
Figure 5:
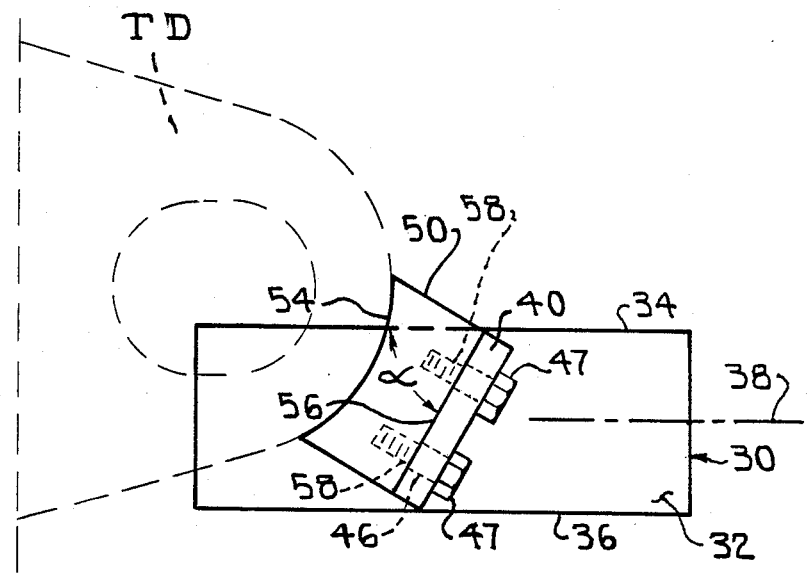
FIG. 5 is front elevational view of the scraper bar elements of FIGS. 3 and 4, with all three bar elements shown in solid lines, and an attachment eyelet shown only in broken lines.

The invention scraper bar attachment in one preferred form is a three-part subassembly generally designated 30, the details of which are better viewed in FIGS. 3, 4 and 5. It comprises interconnectable generally rectangular first steel bar element 32, second transverse steel bar element 40, and third steel bar element 50. The first bar element 32 has an exemplary size of about 4" wide by 11" long, cut from steel plate stock of about ¾" to 1" thick. The opposed longitudinal edges 34 and 36 serve as scraping edges when the attachment is assembled on the vehicle. The length is limited so as to be able to fit between the innermost sprocket 16 and its nearest opposed middle flange member 22. An imaginary centerline is indicated at 38 (FIGS. 4 and 5) for bar element 32.

With continuing reference to FIGS. 3–5, the second bar element 40 is preferably of the same general stock material, having an exemplary size of about 4" wide by 9¼" long. Bar 40 is welded as at 41 to the midportion of bar element 32, and constitutes part of the mounting arm which should be limited in length so as to preclude or minimize any undesirable moment movement of the bar assembly responsive to buildup forces of compacted mud and debris or the like. Bar 40 has opposed longitudinal edges 42, 42, and opposed longitudinal ends 43, 44. End 43 is the end welded at 41 to bar element 40, and the other free end 44 is shown provided with a pair of clearance apertures 46, 46 to receive attachment bolts 47,47 which collectively therewith provide part of the means for detachably mounting the scraper bar. While bars 32 and 40 are preferably welded with the major planes perpendicular to one another, bar 40 is distinctly canted as shown by angle $\alpha$ in FIG. 5. The angle $\alpha$ may have a range of from about 45°–60° and more preferably is about 57°. The canted disposition serves to deflect scraped-off debris to the side of that track assembly. Bar 40 has an imaginary longitudinal centerline 48. The aforementioned detachable mounting is necessary to facilitate periodic removal of the hub subassembly S. The close mounting distance of between ½" to 1" of the scraper bar relative to the hub's cylindrical surface places the scraper bar element 32 between the greater-radial-projecting innermost sprocket gear 16 and the hub's midway positioned flange members 22. Therefore, the provision of detachable mounting is necessary to effect normal maintenance functions.

Proceeding next to the third bar element 50, in the form shown in association with FIGS. 1–5, it is a relatively shorter length steel member, approximately 4" wide and 3" long, the specific length of which will be determined by the distance needed from the vehicle frame or frame attached member to assure the strategic placement of the scraper bar relative to the inner sprocket hub 10. For the types of military tracked vehicles for which this form of the scraper was designed, the chassis or main body frame is known as the M88 tank chassis and is believed to have the same tie down arrangement as the M60 tank chassis. These vehicles are commonly provided with a plurality of approximately six or eight differently located tie-down eyelets or partial ring-like members. One such tie-down eyelet member is designated TD in drawing FIGS. 1, 2 and 5 and has an arcuate free outer peripheral portion to which the third bar element 50 is adapted to be rigidly attached by the weldment 52 along one complementally curved edge 54 thereof. Tie-down eyelets or members TD as shown have a flared base portion. Two such members are commonly welded to the opposite sides of the vehicle frame F via its flared mounting base; their placement is in the area adjacent the drive sprocket assembly hub member; as shown. These standardly provided eyelets form a convenient strategically located stationary structural member or frame appendage for attachment of the subject scraper bar assembly SB. To facilitate the aforementioned detachable mounting, third bar element 50 has a straight edge 56 opposite the aforesaid curved edge 54, which straight edge 56 is adapted to abut with the dual apertured free end 44 of second bar element 40.

Said straight edge 56 is provided with a pair of tapped holes 58,58 for complementally receiving the aforementioned attachment bolts 47,47 better seen in FIG. 5.

The aforesaid basic three part scraper bar subassembly SB when assembled has a generally U-shape or μ-shape configuration of which the two legs constituted by the first and third bar elements 32,50 are essentially parallel, and the interconnecting second bar element 40 forms a canted bight portion. While this bight portion 40 is shown having a width approximately the same as the scraper bar or first element 32, it is contemplated that it may be of somewhat greater width to provide more area to catch and deflect the scraped-off debris.

MODIFIED/ALTERNATIVE EMBODIMENTS

Figure 6:
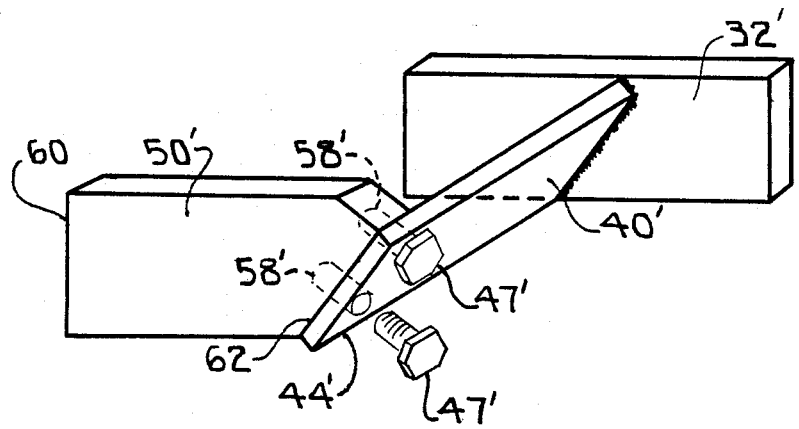
FIG. 6 is a perspective view of a modified embodiment of the scraper bar assembly, the modification residing in a different form of the third bar element for attachment to the vehicle frame.
Figure 7:
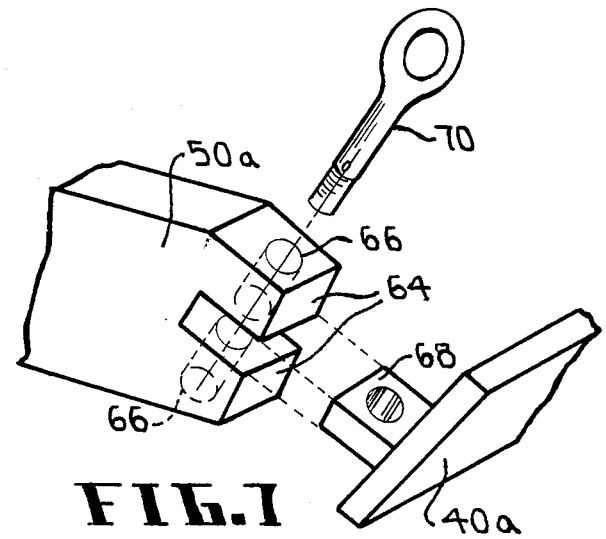
FIG. 7 is another perspective view showing a still further modified embodiment of portions of the second and third bar elements depicting an alternative arrangement to facilitate a detachable interconnection of these components.

FIGS. 6 and 7 of the drawings are representative of two variations of the scraper's second and third mounting bar elements. Relative to the form in FIG. 6, both the first and second bar elements, 32' and 40' respectively, remain the same as in the first described embodiment and need not be redescribed. The form of FIG. 6 is intended to be used on vehicle frames which may not be provided with the same or similar type strategically located tie-down eyelet on the frame. Therefore this embodiment includes the modified third bar element 50' which is of greater length than its counterpart 50 of the first-described embodiment, and omits any arcuate attachment edge. The greater length of the bar 50' is dictated by the distance from the frame needed to maintain the strategic location of scraper bar 32'. Thus third bar element 50' is of a length generally corresponding to the combined lengths of previous counterpart bar 50 and the tie-down member TD. Bar 50' is provided with a base end portion 60 which for most mounting applications will be squared or flat and will be welded to the vehicle framework. Its opposite free end is provided with a flat mounting surface 62 corresponding to the previous embodiment's straight edge 56, surface 62 being adapted to engage or mate with the outer longitudinal end 44' of second bar 40'. The flat mounting surface 62 has a pair of tapped bolt-receiving apertures 58', 58' to receive the mounting or attachment bolts 47',47', thereby providing the same form of detachable mounting as provided in the aforedescribed first embodiment. The attachment and operation are believed to be quite apparent and need not be further described.

Referring next to FIG. 7, there is illustrated a modified form of the complemental detachable mounting features for adjacent end portions of modified second bar element 40a and modified third bar element 50a. End portion 50a is bifurcated to provide a clevis whose spaced arms 64,64 are apertured at 66 and adapted to receive the complementally fitting apertured tongue member 68 provided on the free end of modified second bar element 40a. A suitable locking pin 70 is provided to complete the interconnection by being inserted through the aligned apertures of the mated tongue 68 and clevis arms 64. The provision of the clevis and tongue elements may be reversed on the respective bar elements if desired. The locking pin shank end may be provided with either or both threads and cotter pin hole and cotter pin means, as well as with an eyelet head to receive a captivity chain or lanyard to guard against loss of pin 70.

Whether the bar 30 is mounted with its centerline 38 on a horizontal alignment with the centerline of hub portion 10, as per FIG. 4, or with the top longitudinal edge 34 of bar 30 more nearly on the hub's horizontal centerline, as per FIG. 2, the simple operation remains essentially the same. The bar 30 is preferably spaced approximately ½" to 1" away from the sprocket hub surface, and effectively scrapes off and laterally deflects any accumulated mud, snow ice or other debris, thereby achieving the aforedescribed objectives and advantages.

It is quite apparent that still other changes and alterations may be made, such as providing tapered or beveled scraping edges, without departing from the spirit and scope of the invention as defined in the appended claims.

What is claimed is:

1. For use with a track type vehicle of the type comprising a body frame, a pair of endless track assemblies mounted on said frame, drive sprocket means including a cylindrical drive sprocket hub subassembly for motivating each track assembly, and a stationary structural member secured to each side of said frame and being in close proximity to one end of each of said track assemblies adjacent said drive sprocket means, the invention of scraper bar attachment means for each track assembly, said scraper bar means comprising:

(a) first, second, and third generally planar rectangular bar elements which when fixedly interconnected and attached to said body frame form a generally U-shape configuration of which said first and third bar elements constitute the legs of the U-shape portion, said legs being essentially parallel to each other and to the cylindrical drive sprocket hub subassembly, with one leg being in close proximity to said hub to facilitate the scraping of collected mud or debris, and the other leg adapted to be operatively rigidly attached to said frame; and (b) The second bar element constituting a bight portion connecting the legs of the U-shape portion and being notably canted at an angle of between about 45° and 60° from a horizontal plane to laterally deflect the scraped-off mud or debris.

2. The scraper bar means of claim 1, wherein said first planar bar constitutes a scraper bar element with at least a portion thereof constituting one of the legs of said U-shape configuration, said scraper bar element having an imaginary longitudinal centerline and adapted to be operatively supported in close but slightly spaced proximity to at least approximately an inner one half of said drive sprocket hub subassembly such that its centerline is generally parallel to the centerline of said cylindrical drive sprocket hub subassembly;

the said second planar bar having one end of a pair of opposed longitudinal ends non-removably fixedly attached generally perpendicular to said first or scraper bar element at a general middle portion thereof, said second planar bar which constitutes the canted bight of said scraper bar means having its other longitudinal end free and provided with means to facilitate removable mounting thereof complementally with one end of said third planar bar element; and the third bar element having one end with complemental means to cooperatively align and mate with said second bar element and its means for facilitating the removable mounting therewith, and having its other end adapted to be fixedly rigidly operatively attached to said body frame.

3. The scraper bar means of claim 2, wherein said first scraper bar element has opposed top and bottom longitudinal edges adapted for scraping, and an imaginary longitudinal centerline between said longitudinal edges, said scraper bar when disposed in operative position having said centerline generally parallel to and adjacent the drive sprocket hub at the approximate horizontal centerline of said hub.

4. The scraper bar means of claim 1, wherein the said stationary structural members secured to said body frame are of at least partial ring shape constituting part of multiple tie down eyelet rings, said rings having an arcuate free peripheral portion, and said third planar bar element having a complementally arcuate end adapted to become fixedly welded to the arcuate free peripheral portion so as to position the scraper bar means with its scraper bar element in close proximity to at least an axially inwardly approximate one half portion of said cylindrical drive sprocket hub subassembly.

5. The scraper bar means of claim 1, wherein said second and canted bar element is of width greater than the width of the first bar element and is affixed at a canted angle of about 57°.

6. The scraper bar means of claim 1, wherein said first and second bar elements are welded together, and said second and third bar elements have cooperative means for complementally mating or aligning and for detachably interconnecting each to the other.

7. The scraper bar means of claim 6, wherein said cooperative means on said second and third bar elements include complementally threaded bolts and holes to effect detachable interconnection thereof.

8. The scraper bar means of claim 6, wherein said cooperative means on said second and third bar elements include complemental clevis and apertured tongue and fastening pin means to effect detachable interconnection thereof.

9. For use with a track type vehicle of the type comprising a body frame, a pair of endless track assemblies mounted on said frame, drive sprocket means including a cylindrical drive sprocket hub subassembly for motivating each track assembly, each drive sprocket hub subassembly including axially aligned inner and outer hub portions having opposed drive sprockets collectively cooperatively interengaging said endless track assemblies, and a stationary structural member secured to said frame in close proximity to one end of each of said track assemblies adjacent said inner hub portion of said drive sprocket means, the invention of scraper bar means for each track assembly comprising in combination (a) a first planar, generally rectangular shaped bar constituting a scraper bar element having an imaginary longitudinal centerline, said scraper bar element adapted to be supported in close but slightly spaced proximity to said inner hub portion such that its centerline is parallel to said cylindrical drive sprocket hub portion;

(b) a second planar bar element also of generally rectangular form having one end of a pair of opposed longitudinal ends fixedly attached generally perpendicular to said first bar scraper element generally midway between its ends, with the other or second end being free and provided with means to facilitate removable mounting thereof operatively to said vehicle frame; the said second bar element being canted relative to a horizontal plane and having its major longitudinal plane perpendicular to that of said first planar bar element and parallel to a longitudinal plane through each endless track assembly, the said canted disposition adapted to laterally deflect scraped-off mud and debris to the inside of each track assembly; and (c) a third planar mounting bar element having opposed first and second ends, the second end including means to cooperatively align and mate with said other free or second end of said second planar bar and its means for facilitating removable mounting therewith, and said third planar mounting bar having its first end adapted to be fixedly and rigidly attached to said vehicle frame.

10. The scraper bar means of claim 9, wherein said second planar bar is canted and welded to said first or scraper bar element at a angle which is between approximately 45° and 60°, more preferably being at about 57°.

11. The scraper bar means of claim 10, wherein the said axially aligned outer sprocket hub portion is generally hollow with an open outer end, and having a plurality of circumferentially spaced elongated openings serving to pass and expel any mud and debris in a known manner for that portion of said drive sprocket and hub means, and wherein said invention scraper bar means is mounted with the scraper bar element disposed closely adjacent the axially aligned inner sprocket hub portion, and said second and third bar means which facilitates the removable mounting of said scraper bar includes removable fastener pin or bolt and complemental aperture means so as to in turn permit removal of said sprocket hub means when necessary.

12. The scraper bar means of claim 11 wherein the second and third bar means which facilitate the removable mounting of said scraper bar further respectively include cooperatively engaging apertured clevis and tongue members adapted to cooperate with each other and with said removable fasterner pin or bolt means.

* * * * *